United States Patent
Phadke et al.

(10) Patent No.: US 7,596,007 B2
(45) Date of Patent: Sep. 29, 2009

(54) MULTIPHASE DC TO DC CONVERTER

(75) Inventors: Vijay Phadke, Kowloon (HK); James Sigamani, Kowloon (HK); Israel Beltran, Kowloon (HK)

(73) Assignee: Astec International Limited, Kwun Tong, Kowloon (HK)

( * ) Notice: Subject to any disclaimer, the term of this patent is extended or adjusted under 35 U.S.C. 154(b) by 307 days.

(21) Appl. No.: 11/580,533

(22) Filed: Oct. 13, 2006

(65) Prior Publication Data

US 2007/0086224 A1    Apr. 19, 2007

Related U.S. Application Data

(60) Provisional application No. 60/727,200, filed on Oct. 14, 2005.

(51) Int. Cl.
*H02M 7/48*    (2007.01)
(52) U.S. Cl. ..................................... 363/71
(58) Field of Classification Search .............. 363/71, 363/89, 132, 127
See application file for complete search history.

(56) References Cited

U.S. PATENT DOCUMENTS

| | | | |
|---|---|---|---|
| 6,574,125 B2 | 6/2003 | Matsukawa et al. | |
| 6,583,999 B1 | 6/2003 | Spindler et al. | |
| 6,751,107 B2 * | 6/2004 | Matsuda et al. | 363/71 |
| 7,035,125 B2 * | 4/2006 | Yoshida | 363/71 |
| 7,072,194 B2 * | 7/2006 | Nayar et al. | 363/71 |
| 2004/0196679 A1 | 10/2004 | Apeland et al. | |

* cited by examiner

*Primary Examiner*—Shawn Riley
(74) *Attorney, Agent, or Firm*—Harness, Dickey & Pierce, P.L.C.

(57) ABSTRACT

A multiphase DC to DC converter includes an input, an output, at least first and second converters, an inductor, an output capacitor, and a drive circuit. The drive circuit is configured for switching the first and second converters with a predetermined phase shift therebetween. The output capacitor is operatively coupled between the first and second converters and the output. The inductor can be placed either at the input side or the output side. When placed at the input side, the inductor is operatively coupled between an input capacitor and the first and second converters. When placed at the output side, the inductor is operatively coupled between the first and second converters and the output capacitor. The multiphase DC to DC converter is capable of achieving lossless switching transitions and negligible ripple current in the output capacitor.

23 Claims, 16 Drawing Sheets

US 7,596,007 B2

MULTIPHASE DC TO DC CONVERTER

CROSS-REFERENCE TO RELATED APPLICATION

This application claims the benefit of U.S. Provisional Application No. 60/727,200, filed on Oct. 14, 2005.

FIELD OF INVENTION

The present disclosure relates to DC to DC converters having a multiphase architecture.

BACKGROUND

The statements in this section merely provide background information related to the present disclosure and may not constitute prior art.

Various types of DC to DC converters are known which include two or more converters operated in a multiphase configuration. For example, multiphase DC to DC converters are known which employ two independent series resonant converters. The two resonant converter outputs are shifted in phase by ninety degrees. This results in overlapping currents at the output. As recognized by the present inventors, however, since the output currents are sinusoidal in nature, even with overlapping, the ripple current in the output capacitor can be quite high. Additionally, the resonant components must be well matched to achieve acceptable current sharing between the two converters. Otherwise, the ripple current in the output capacitor will be even higher. Further, because the operating frequency of the converters is typically varied to achieve regulation, it is difficult to achieve soft switching under all operating conditions. This results in lower efficiency and higher electromagnetic interference (EMI). Accordingly, there is a need for improvements in existing multiphase DC to DC converters.

SUMMARY

According to one aspect of the present disclosure, a multiphase DC to DC converter includes an input, an output, at least first and second converters, an inductor, an output capacitor, and a drive circuit. The drive circuit is configured for switching the first and second converters with a predetermined phase shift therebetween. The inductor is operatively coupled to the first and second converters, and the output capacitor is operatively coupled between the inductor and the output.

According to another aspect of the present disclosure, a multiphase DC to DC converter includes an input, an output, at least first and second converters, an inductor, an output capacitor, and a drive circuit. The drive circuit is configured for switching the first and second converters with a predetermined phase shift therebetween. The output capacitor is operatively coupled between the first and second converters and the output, and the inductor is operatively coupled between (a) the first and second converters, and (b) the input or the output capacitor.

According to yet another aspect of the present disclosure, a multiphase DC to DC converter includes an input, an output, an output capacitor, at least first and second converters, and an inductor operatively coupled to the first and second converters, the inductor providing substantially zero ripple current in the output capacitor when the second converter is operated about ninety degrees out of phase with respect to the first converter.

Further aspects and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description of various embodiments is merely exemplary in nature and is not intended to limit the scope of this disclosure nor its potential applications.

Figure 1A:
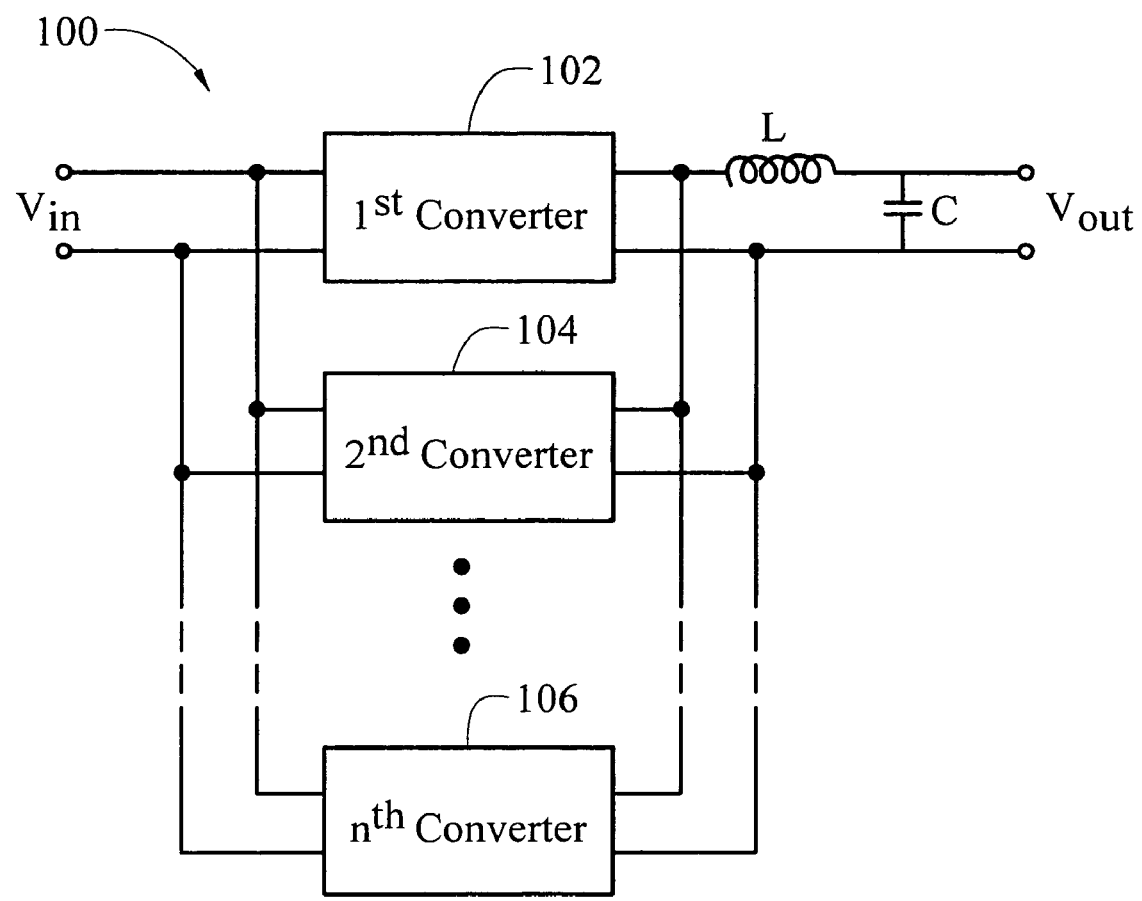
FIG. 1A is a block diagram of a DC to DC converter according to one aspect of the present disclosure.

A multiphase DC to DC converter according to one aspect of the present disclosure is illustrated in FIG. 1A and indicated generally by reference numeral 100. As shown in FIG. 1A, the multiphase converter 100 includes an input $V_{in}$, an output $V_{out}$, multiple converters 102, 104, 106, an inductor L, and an output capacitor C. The multiphase converter 100 also includes a drive circuit (not shown) for switching the multiple converters 102-106 with predetermined phase shifts therebetween. As shown in FIG. 1A, the output capacitor C is operatively coupled between the multiple converters 102-106 and the output, and the inductor L is operatively coupled between multiple converters 102-106 and the output capacitor C.

Figure 1B:
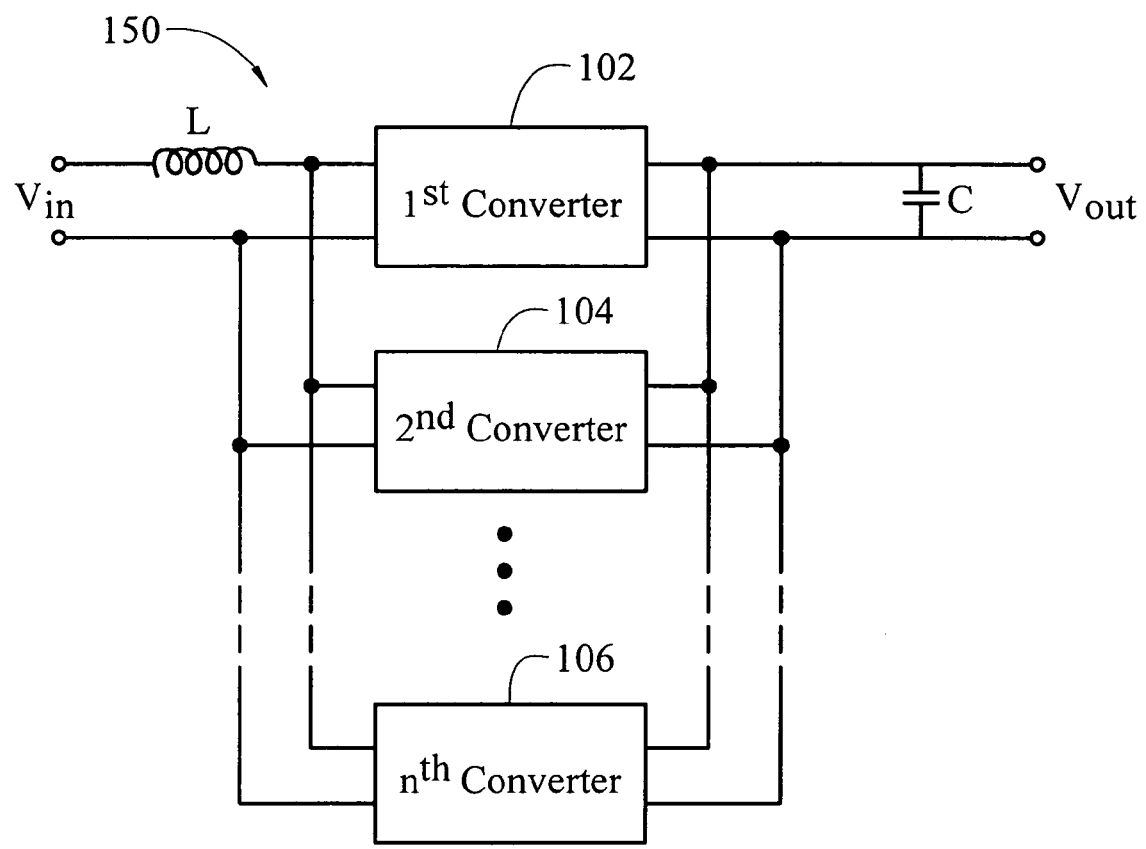
FIG. 1B is a block diagram of a DC to DC converter according to another aspect of the present disclosure.

FIG. 1B illustrates another multiphase DC to DC converter 150. The converter 150 of FIG. 1B is similar to the converter 100 of FIG. 1A. However, in the converter 150 of FIG. 1B, the inductor L is operatively coupled between the input Vin and the multiple converters 102-106. As apparent to those skilled in the art, the value of inductor L in the converter of FIG. 1A may be different than the value of inductor L in the converter of FIG. 1B.

As further explained below, providing inductor L in the multiphase converters of FIGS. 1A and 1B advantageously reduces the ripple current in the output capacitor C, balances the currents in the multiple converters 102-106, and facilitates lossless switching transitions. This, in turn, results in multiphase DC to DC converters having improved efficiencies as compared to those of the prior art.

While three individual converters 102-106 are shown in FIGS. 1A and 1B, it should be understood that two or more converters may be employed in any given application of this disclosure. For example, additional converters can be added to a particular implementation to achieve higher efficiencies and/or for increased output power. Regardless of the number, the multiple converters preferably employ the same topology. For example, the multiple converters may be forward converters, bridge converters (including full bridge, half bridge, etc.) push-pull converters, etc. The phase difference between different converters can be varied to control the overlap of rectified pulses depending upon the number of converters employed. Additionally, the duty cycles of each converter's power switch(es) can be varied depending on the resonant parameters. For example, if only two converters are used, each can operate at a duty cycle of approximately 50% with a phase difference of approximately ninety degrees. Alternatively, if four converters are used, each can be switched a duty cycle of approximately 50% with a phase difference of approximately forty-five degrees.

Further, each converter preferably includes a rectification circuit, such as a center tapped full wave rectifier, a bridge rectifier, or any other suitable rectification circuit for producing DC power from AC power.

These teachings can be employed in a wide variety of DC power applications, including those where a higher voltage is converted into a lower output voltage with galvanic isolation at a high efficiency. Some examples include, without limitation, generating a low voltage, isolated output bus (6V to 12V) from a 48V telecommunications input bus, and generating a low voltage output bus from a high voltage (350V to 400V) DC bulk supply. In such applications, a pre-regulator or a post-regulator can also be used to achieve tighter regulation and transient response. More generally, the present teachings can be employed in any interleaved forward conversion topology using overlapped control drive.

Figure 2:
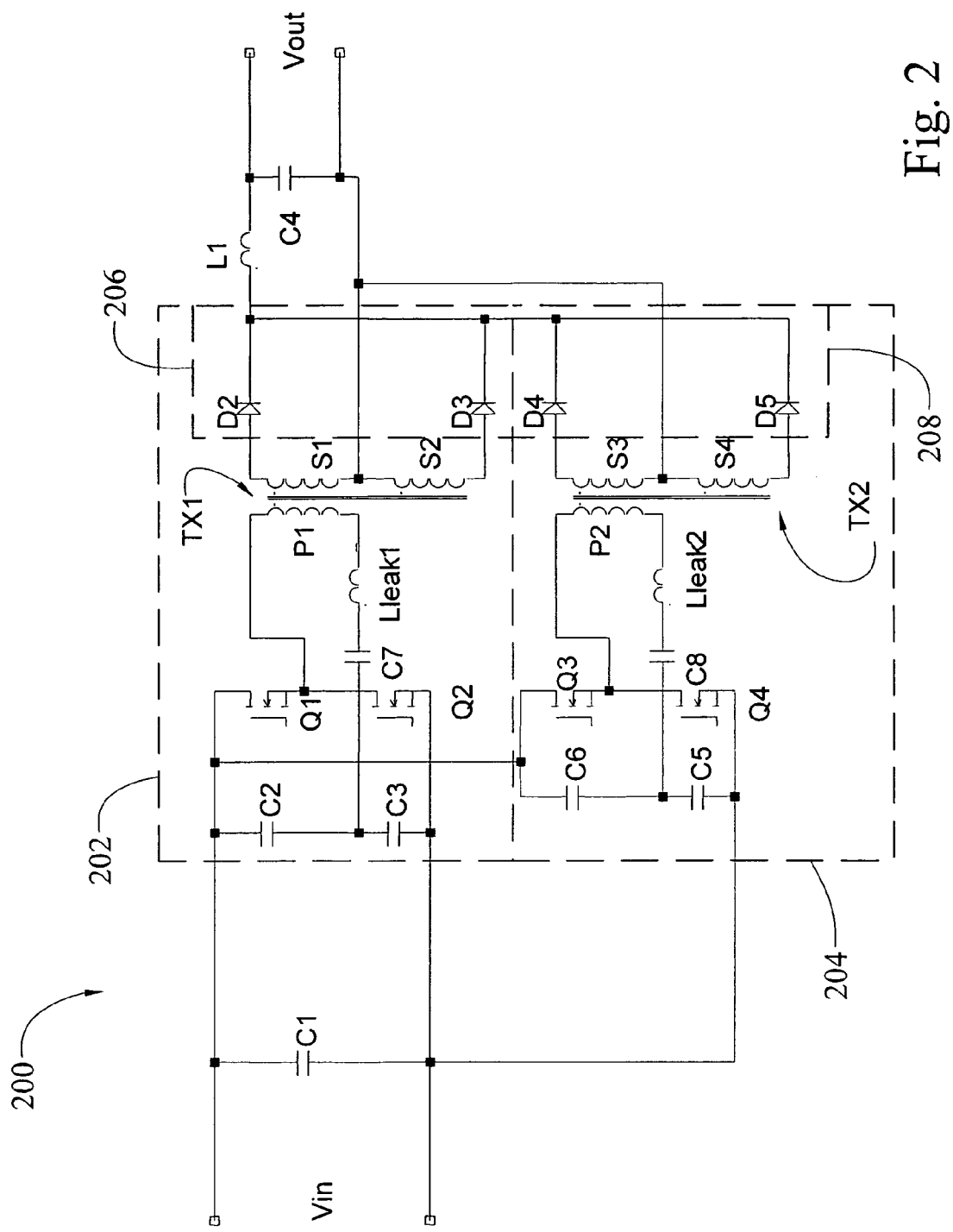
FIG. 2 is a circuit diagram of a DC to DC converter according to one embodiment of the present disclosure.

FIG. 2 illustrates a multiphase DC to DC converter 200 according to one specific embodiment of the present disclosure. The converter 200 includes an input $V_{in}$, an output $V_{out}$, a first converter 202, a second converter 204, an inductor L1 and an output capacitor C4. The first and second converters 202 and 204 are coupled between the input $V_{in}$ and the inductor L1. Further, the output capacitor C4 is coupled between the inductor L1 and the output $V_{out}$.

In the particular embodiment of FIG. 2, the first and second converters 202, 204 employ the same topology. Each is a half bridge converter having its own isolation transformer TX1, TX2 coupled to a rectification circuit 206, 208. In the embodiment of FIG. 2, the rectification circuits 206, 208 are configured as center tapped full wave rectifiers.

As shown in FIG. 2, the first converter 202 includes power switches Q1 and Q2 coupled to the primary winding P1 of transformer TX1. Secondary windings S1 and S2 of transformer TX1 are coupled to the first rectification circuit 206 including diodes D2 and D3. The second converter 204 includes power switches Q3 and Q4 coupled to the primary winding P2 of transformer TX2. Secondary windings S3 and S4 of transformer TX2 are coupled to the second rectification circuit 208 including diodes D4 and D5. The parasitic inductances (including a separate external inductor, when employed, and any parasitic inductance reflected from the secondary side) are combined and shown in FIG. 2 on the primary sides of transformers TX1, TX2 as Lleak1 and Lleak2. Capacitors C7, C8 are blocking capacitors. Further, transformers TX1, TX2 each have a turns ratio of N:1.

In the embodiment of FIG. 2, the inductor L1 and the output capacitor C4 form the output filter. Although the multiphase converter 200 of FIG. 2 is configured as a 12V DC output voltage power supply, the teachings of this disclosure are not so limited as apparent to those skilled in the art.

During operation of the multiphase converter 200, primary winding P1 is energized when one of the power switches Q1 or Q2 is turned on. Similarly, primary winding P2 is energized when one of the power switches Q3 or Q4 is turned on. Energizing the primary windings P1 and P2 energizes secondary windings S1-S2 and S3-S4, respectively. As the secondary windings S1-S4 are energized, power is rectified by the first and second rectification circuits 206, 208 and delivered to a load coupled to the output.

Figure 3:
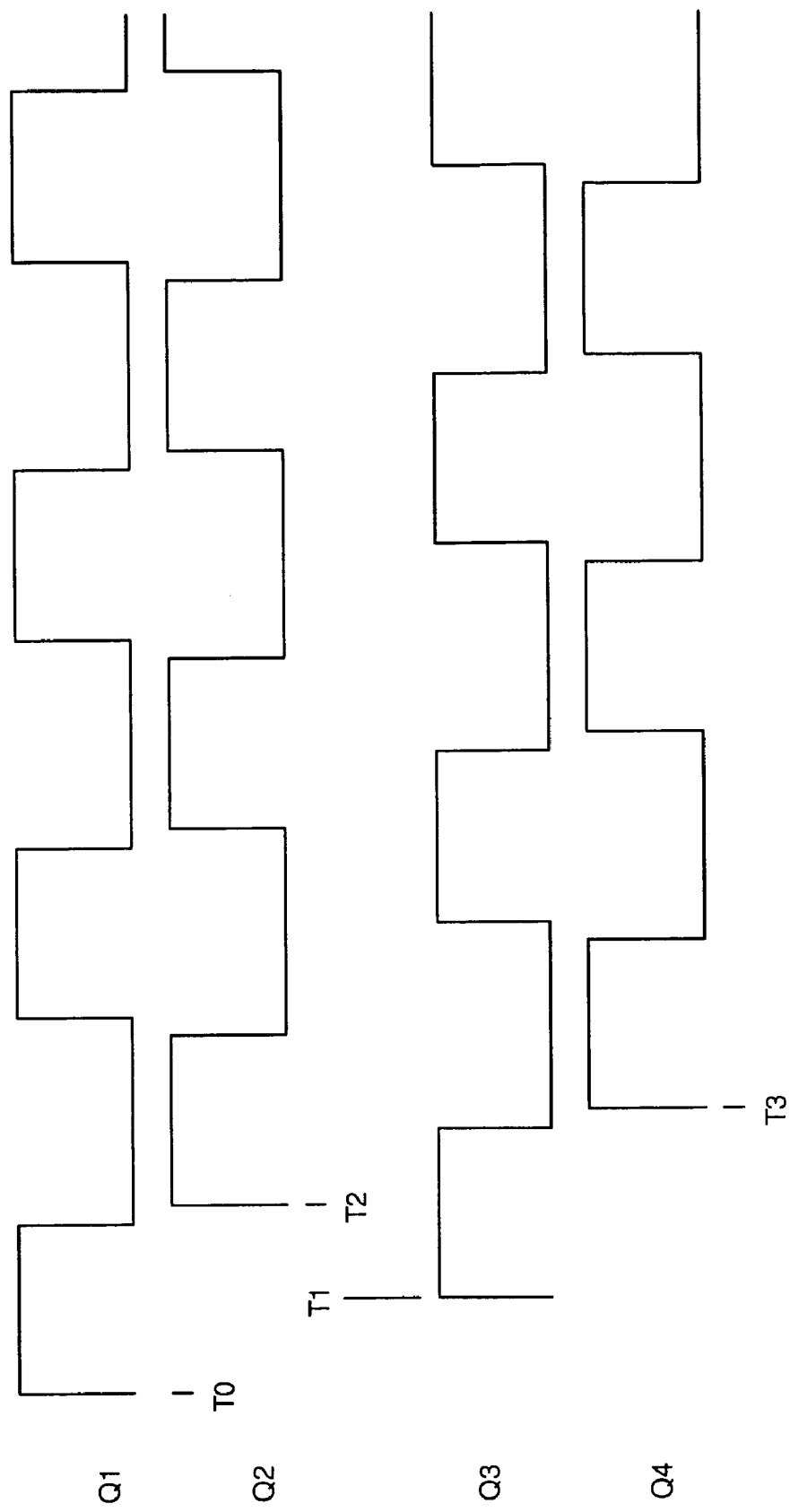
FIG. 3 is a timing diagram depicting operation of power switches in the DC to DC converter of FIG. 2.

The timing diagram of FIG. 3 illustrates how the power switches Q1-Q4 are switched at a fixed frequency by a drive circuit (not shown) in this particular embodiment. As shown in FIG. 3, the converters are switched such that the second converter 202 operates at a phase difference of about 90 degrees with respect to the first converter 202. It should be understood, however, that the first and second converters 202, 204 may be operated at other phase differences without departing from the scope of this disclosure. Switches Q1 and Q2 are complimentary. Switches Q3 and Q4 are also complimentary but shifted in phase by ninety degrees with respect to switches Q1 and Q2. Further, FIG. 3 illustrates how both converters operate close to a fifty percent (50%) duty cycle. More specifically, in this particular embodiment, both converters are switched at a 48% duty cycle with a short dead time between switches Q1, Q2 and between switches Q3, Q4.

As further shown in FIG. 2, the outputs of the converters are shorted together before the LC filter (inductor L1 and output capacitor C4). Such interconnection with a ninety degree phase delay as mentioned above results in overlapping outputs. This overlap helps force current through each transformer to increase or decrease in resonant fashion if the blocking capacitors C7, C8 are selected to resonate with the leakage inductances Lleak1, Lleak2. With proper selection of the blocking capacitors C7, C8, the leakage inductances Lleak1, Leak2 (possibly including additional external inductors and/or parasitic inductance reflected from the secondary sides of transformers TX1, TX2), and the magnetizing inductances of transformers TX1, TX2, zero voltage turn on and zero current turn off can be achieved under all operating conditions.

Operation of the converter 200 of FIG. 2 will now be further explained. Assume a steady state condition when the first converter 202 is delivering power with switch Q1 turned on at time T0. The voltage on the blocking capacitor C7, which was charged to a voltage $V_{cb}$ earlier, will discharge to zero when the current through primary winding P1 reaches the reflected load current. At this point, the voltage across the secondary windings S1, S2 becomes:

$$\frac{\left(\frac{V_{in}}{2}\right)}{N}$$

where N is the transformer turns ratio. At time T1, the power switch Q3 of the second converter 204 is turned on and the transformer TX2 is energized. At this point, the voltage across blocking capacitor C8 is $V_{cb}$. The voltage across the secondary windings S3, S4 of the second converter 204 will be:

$$\frac{\left(\frac{V_{in}}{2}\right)+V_{cb}}{N}$$

Since the voltage across the secondary windings S3, S4 is greater than the voltage across secondary windings S1, S2 by Vcb/N, the second converter 204 will start delivering the load current.

Figure 4:
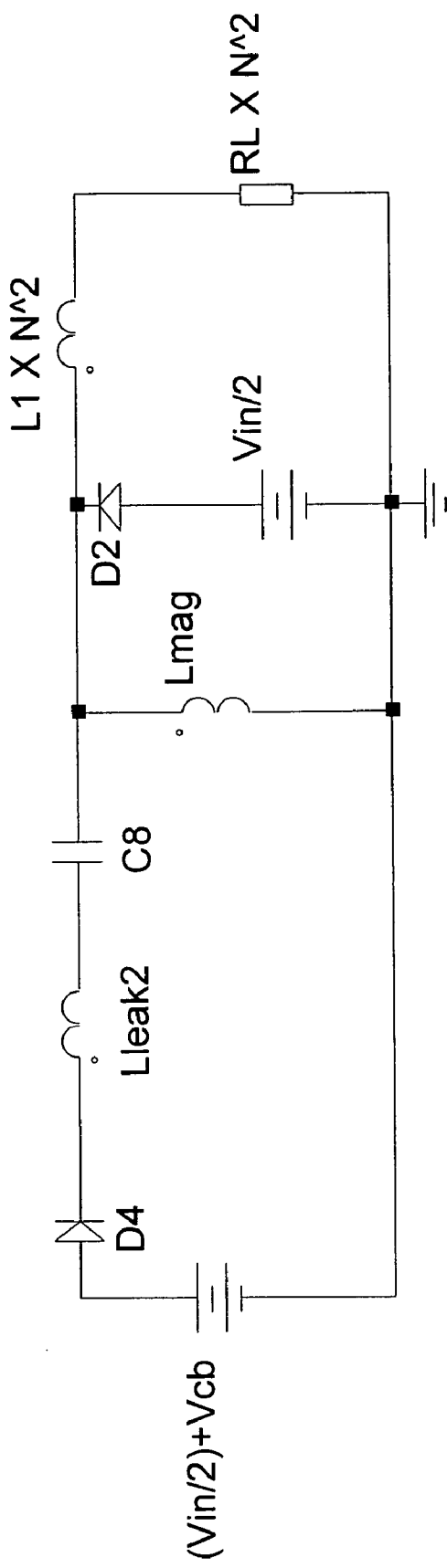
FIG. 4 is an equivalent circuit at one of the primary windings in the DC to DC converter of FIG. 2.

FIG. 4 shows the equivalent circuit (including the effect of the load resistance RL) at primary winding P2 at time T1. The current in the second converter 204 increases in resonant fashion due to the leakage inductance Lleak2 and the blocking capacitor C8 until it reaches a value equal to the reflected load current. At that point, the current delivered by the second converter 204 will follow the reflected load current, which is held constant by the inductor L1. Thus, a resonant condition is forced by the other converter 202.

The rate at which the current through the second converter 204 increases is the same rate at which the current through the first converter 202 decreases. When the current through the second converter 204 equals the reflected load current, the current through the first converter 202 will be zero. Therefore, the increase or decrease of current through the converters 202, 204 will be resonant. The resonant frequency will be determined by the leakage inductances Lleak1, Lleak2 and the blocking capacitors C7, C8.

If the resonant components are selected properly, the reflected load current can be made to always resonate back to zero before switch turn off. With zero reflected load current, the current through power switch Q1 during turn off is only the magnetizing current of transformer TX1. By choosing a magnetizing inductance for transformer TX1 sufficient to charge the output capacitance of switch Q1, discharge the output capacitance of switch Q2, and turn on switch Q2 while energy is still circulating through its body diode, zero voltage switching for switch Q2 can be achieved. The circuit operation and equivalent circuit are the same each time current is transferred from one converter 202, 204 to the other.

The inclusion of inductor L1 in the multiphase converter of FIG. 2 substantially reduces or eliminates ripple current in the output capacitor C4. Therefore, the value of inductor L1 can be quite small (e.g., 100 nH). Additionally, the inductor L1 helps achieve current balancing in the converters despite tolerances or variations in the resonant components.

Increasing the current rise/fall time (for example, by increasing the resonant frequency) increases the amount of deadtime available. In many known converters, the peak current increases with increased deadtime, which results in higher RMS currents. However, in the multiphase converter 200 of FIG. 2, the peak current does not increase with increased dead time due to the inductor L1.

Figure 5:
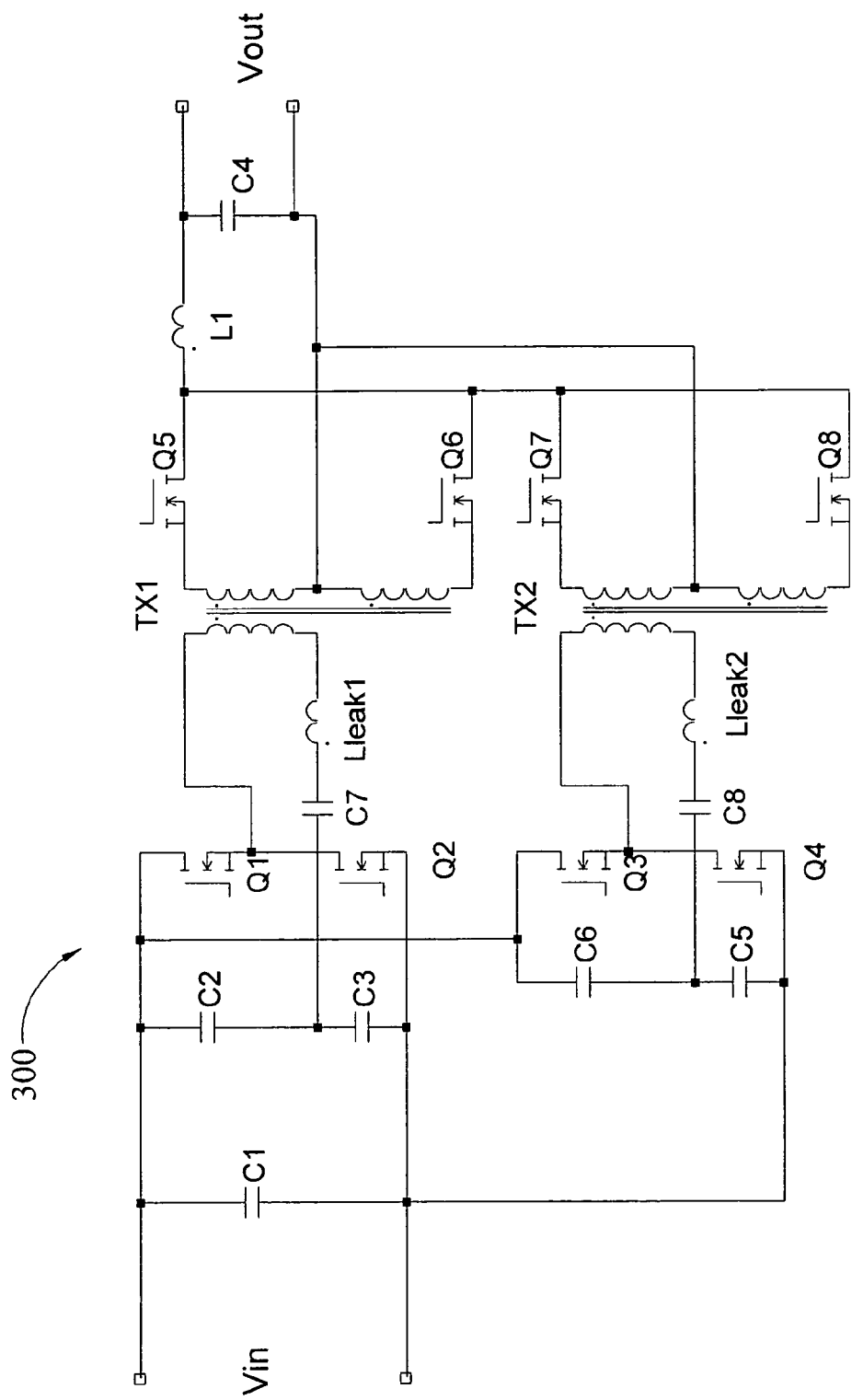
FIG. 5 is a circuit diagram of a multiphase DC to DC converter employing synchronous rectifier MOSFETs.

In alternative embodiments, synchronous rectifier FETs (e.g., MOSFETs) can be used instead of diodes (e.g., in the rectification circuits 206, 208) to further improve efficiency. Since the current through the synchronous FETs (when used) are zero during turn on and turn off, voltage spikes on the FETs can be eliminated. Further, with proper selection of the drive timing, body diode conduction can also be eliminated. Even if some body diode conduction is allowed for safe operation, the losses will be negligible as the current is nearly zero during turn off. FIG. 5 illustrates a multiphase isolated DC to DC converter 300 similar to the converter 200 of FIG. 2, but employing synchronous rectifier MOSFETS (instead of diodes D2-D5).

FIGS. 6-10 depict current and voltage waveforms for the multiphase isolated converter 300 of FIG. 5 as configured for a 275 V DC input voltage, a 12V output voltage, a 100 A output current, and a 1200 W output power. The two half bridge converters were operated at 200 kHz, resulting in an 800 kHz output ripple frequency.

Figure 6:
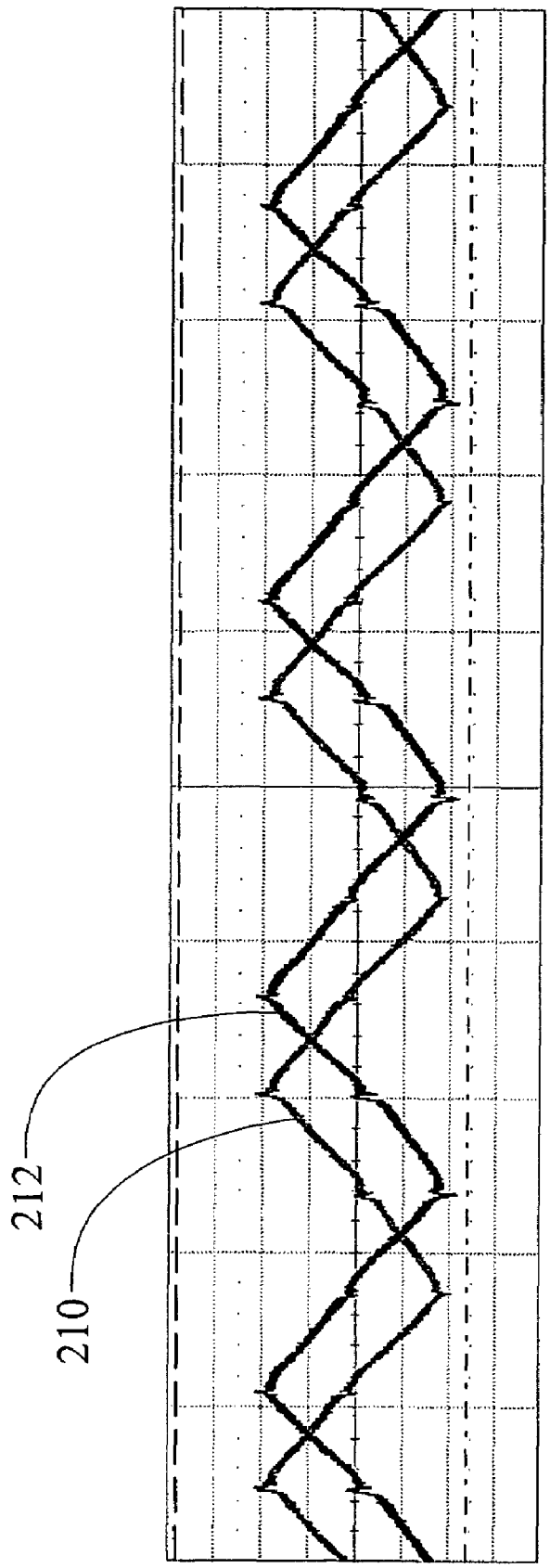
FIGS. 6-10 depict current and voltage waveforms for the multiphase converter of FIG. 5.

FIG. 6 depicts the currents 210, 212 in the primary windings of the two transformers. As shown therein, the primary currents 210, 212 each have a triangular waveform. Similarly, the secondary currents (not shown) are triangular, as are the input and output currents of the isolated converter 300. Further, the rate of change of the waveforms 210 and 212 is substantially the same. As a result, the ripple current in the output capacitor C4 can be substantially zero. For example, the ripple can be up to 2% of the current in the capacitor C4. It should be understood, however, that the ripple current can vary depending on the values of the parasitic inductances Lleak1 and Lleak2 and/or the duty cycles of the first and second converters 202 and 204.

Figure 7:
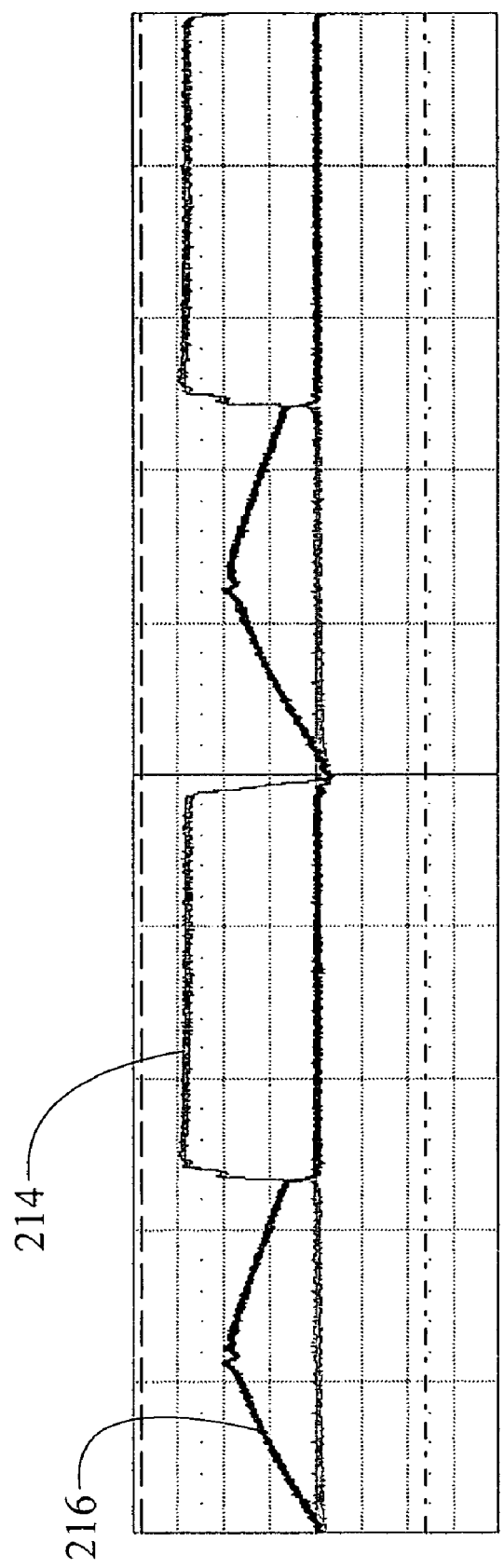

FIG. 7 depicts the voltage 214 across the switch Q1 (Vds) and the current 216 flowing through the switch Q1 (Id). These waveforms 214, 216 show the absence of any voltage or current overlap during switching transitions, except a small magnetizing current at turn off.

Figure 8:
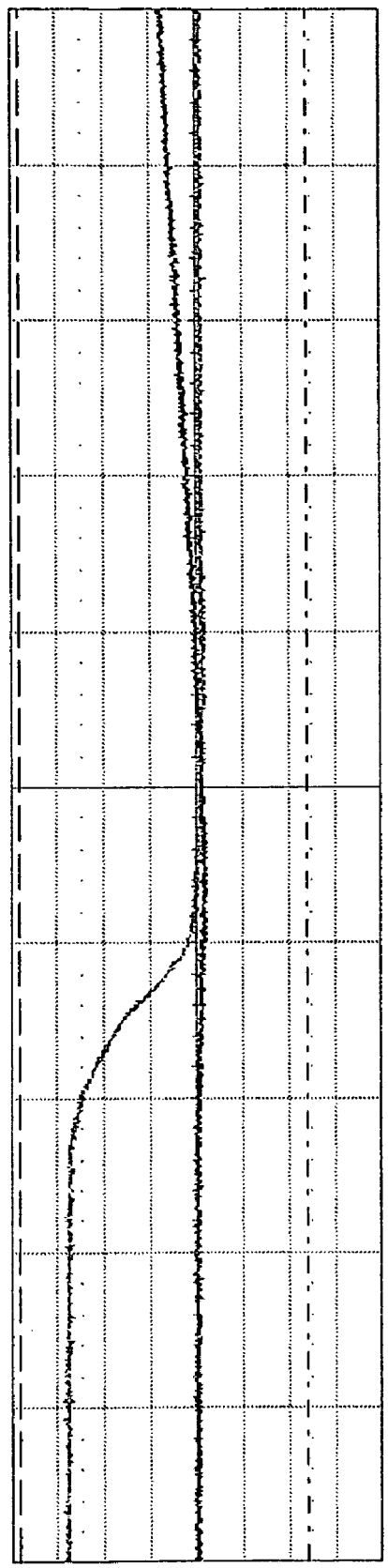
Figure 9:
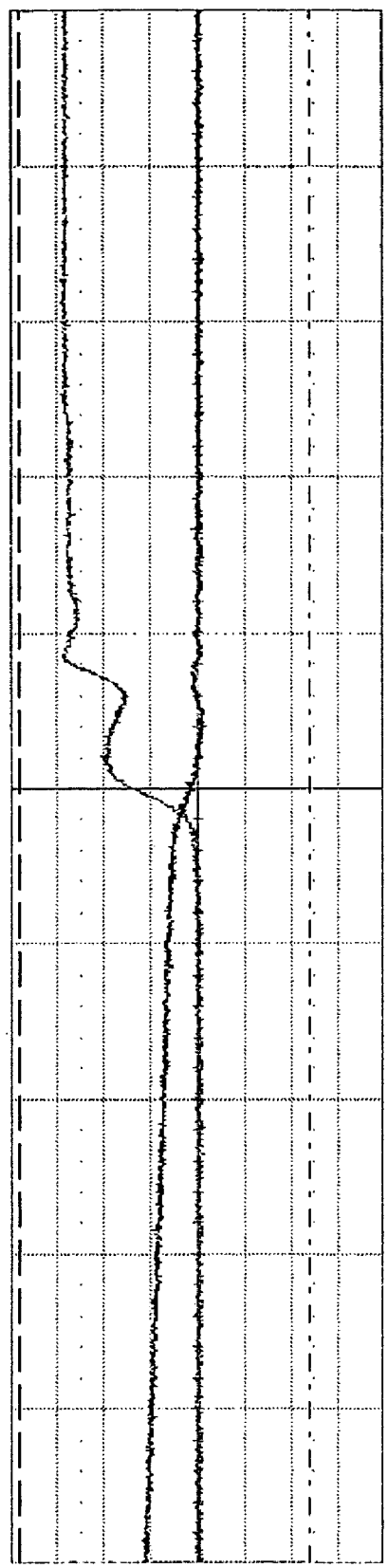
Figure 10:
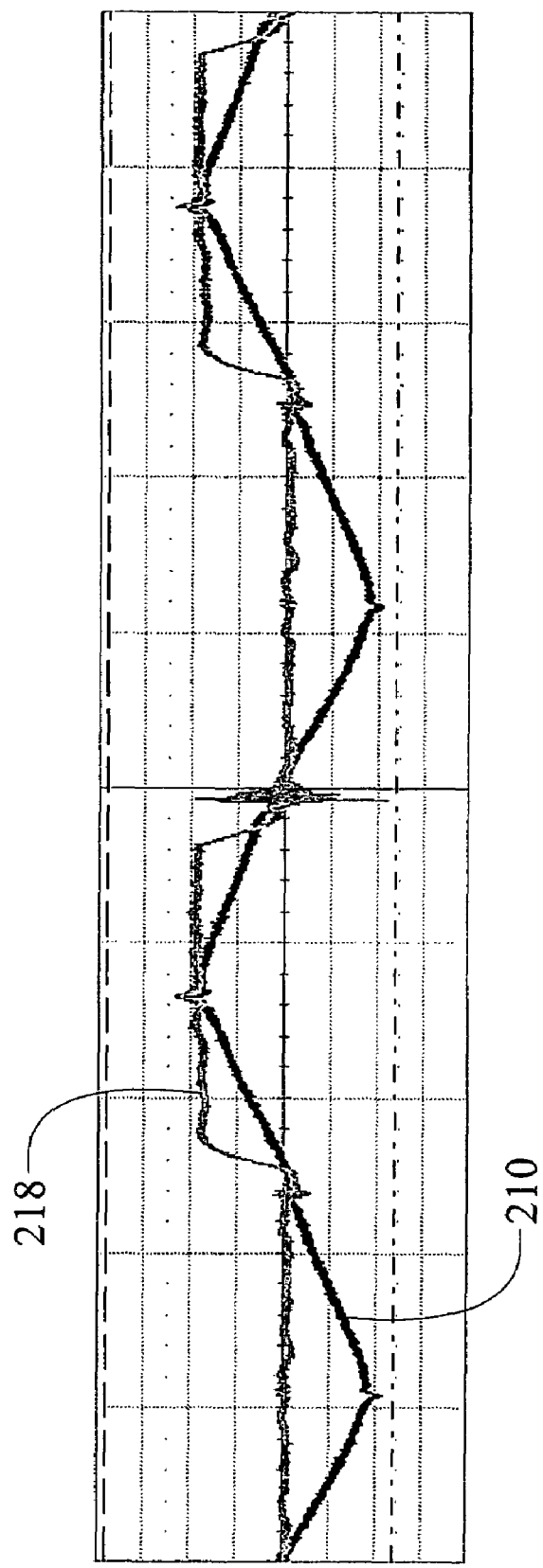

FIG. 8 depicts how switch Q1 turns on at zero current. FIG. 9 depicts how switch Q1 turns off at zero reflected load current, except for a small magnetizing current. FIG. 10 illustrates the current 210 in a primary winding and the gate drive 218 of an associated synchronous rectifier MOSFET. These waveforms illustrate that the reflected load current at the primary is almost zero, except for a small magnetizing current when the synchronous rectifier turns off. This means the body diode does not conduct any appreciable load current.

Figure 11:
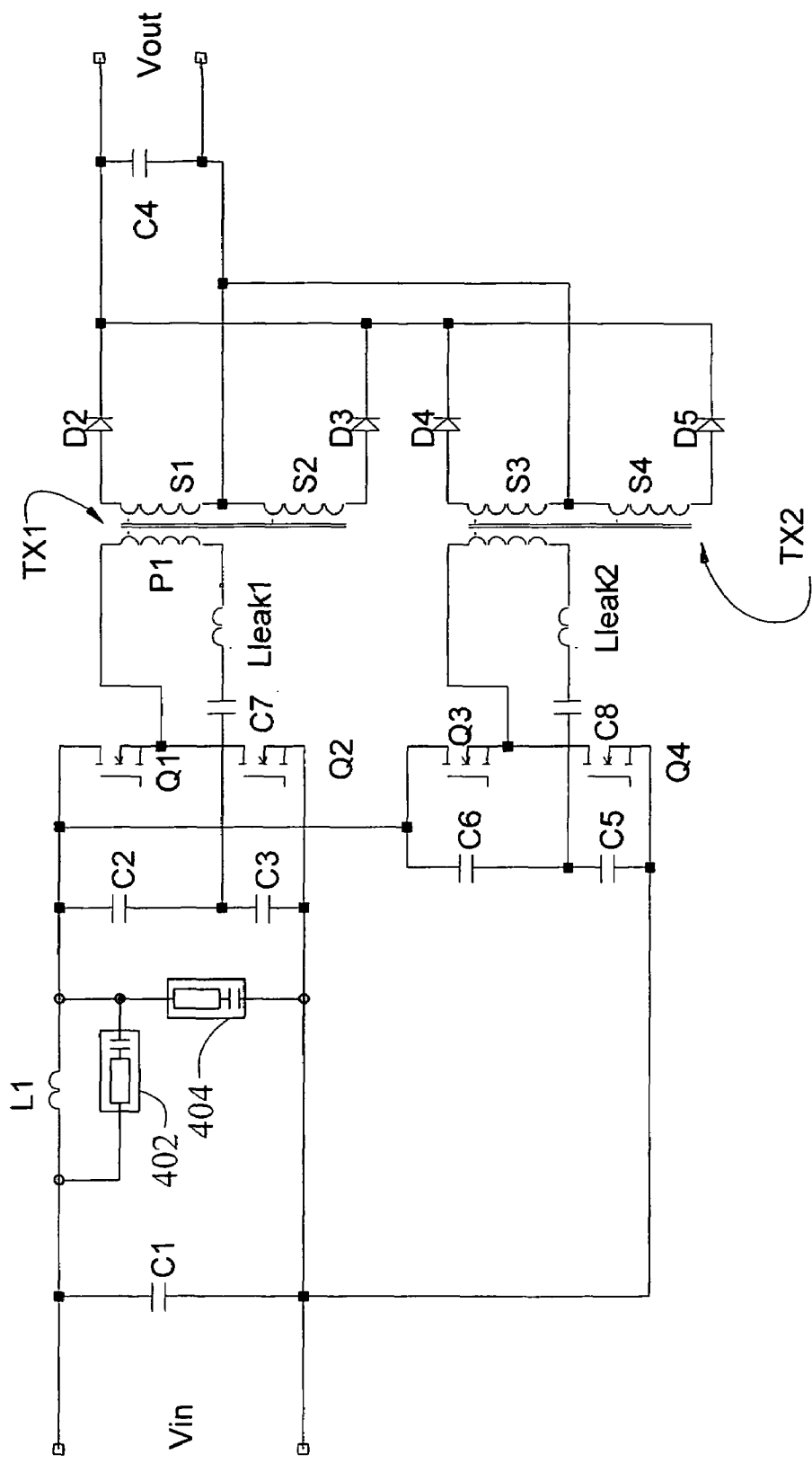
FIG. 11 is a circuit diagram of a multiphase DC to DC converter similar to the converter of FIG. 2, but with the inductor L1 coupled to its input.

FIG. 11 illustrates a multiphase DC to DC converter 400 according to another embodiment of the present disclosure. The converter 400 is similar to the multiphase converter 200 of FIG. 2. However, in the converter 400 of FIG. 11, the inductor L1 is operatively coupled between the converters 202, 204 and the input. More specifically, the inductor L1 in FIG. 11 is coupled between the converters 202, 204 and an input capacitor C1. By including optional snubber circuits 402, 404 (which can be R-C snubbers), the converter 400 of FIG. 11 can achieve the same results as the converter 200 of FIG. 2. When manufacturing certain DC to DC converters, it may be easier to couple the inductor L1 to the input, rather than to output. In these situations, the embodiment of FIG. 11 may be more desirable than the embodiment of FIG. 2 since both embodiments can achieve substantially the same results.

Figure 12:
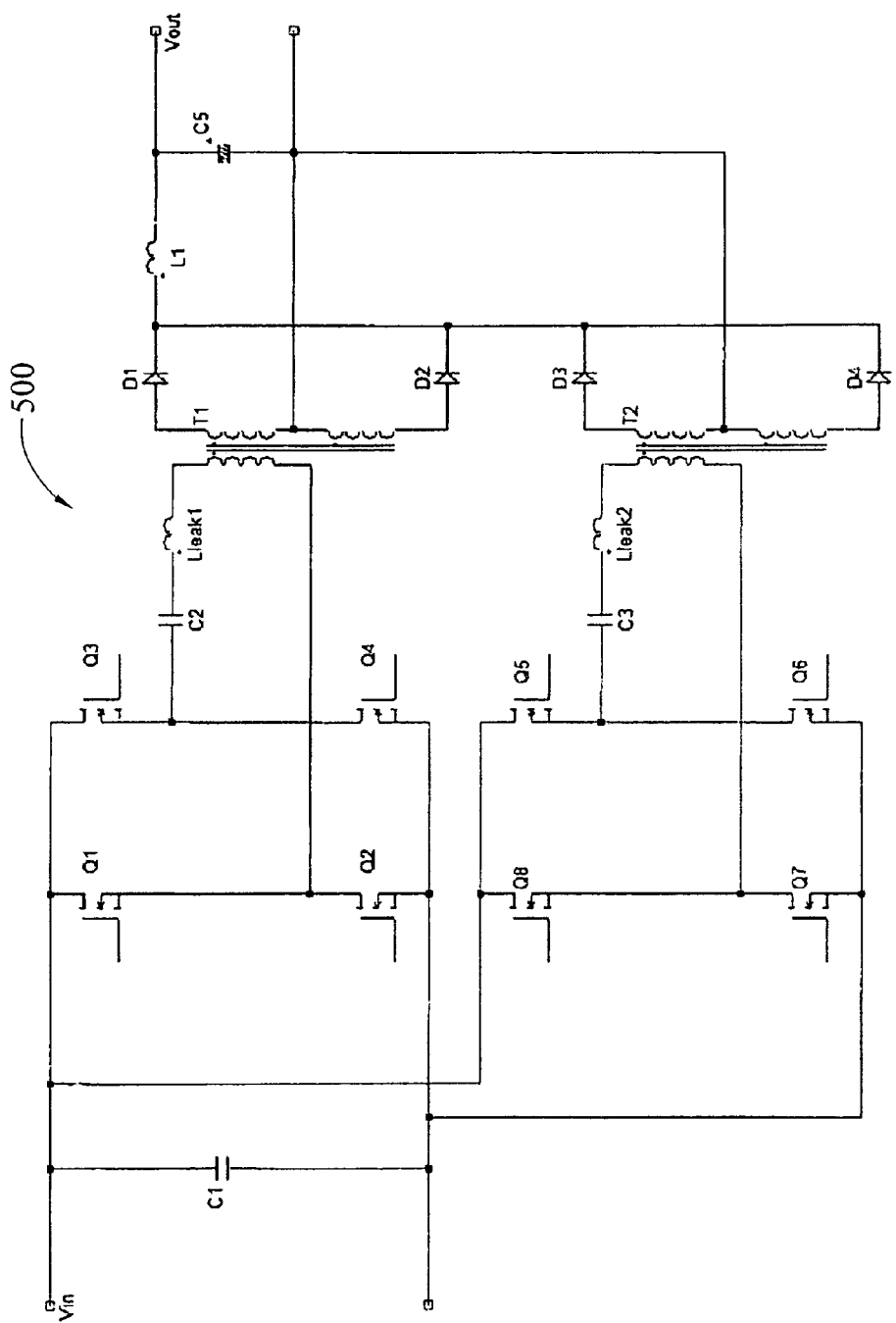
FIG. 12 is a circuit diagram of a multiphase DC to DC converter similar to the converter of FIG. 2, but using a full bridge topology on the primary side.

FIG. 12 illustrates a multiphase DC to DC converter 500 according to another embodiment of the present disclosure. The converter 500 is similar to the multiphase converter 200 of FIG. 2. However, in the converter 500 of FIG. 12, a full bridge topology is employed on the primary side of transformers T1, T2.

Figure 13:
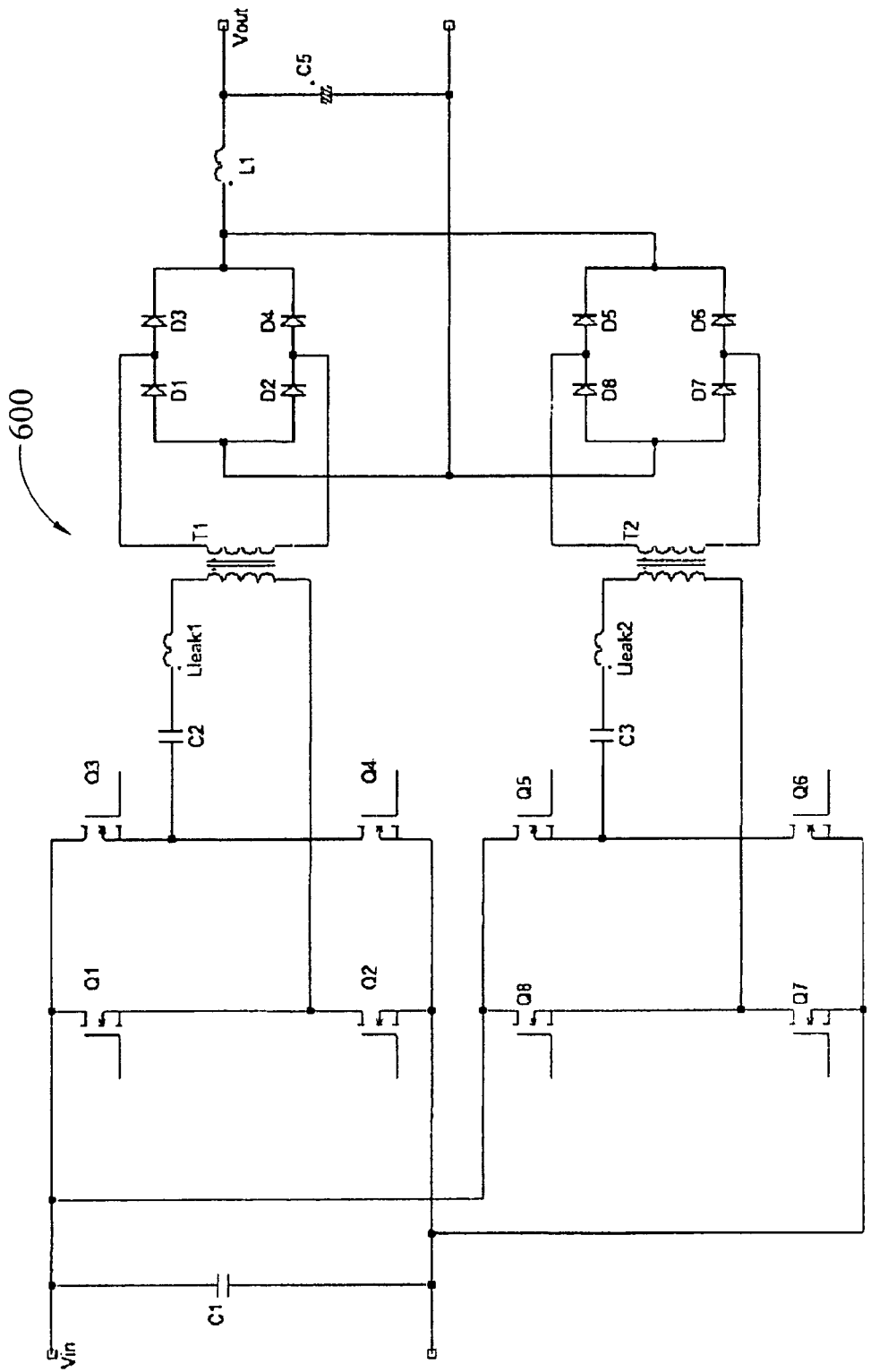
FIG. 13 is a circuit diagram of a multiphase DC to DC converter using a full bridge topology on the primary side and bridge rectifiers on the secondary side.

FIG. 13 illustrates a multiphase DC to DC converter 600 according to yet another embodiment of the present disclosure. The converter 600 employs a full bridge topology on the primary side of transformers T1, T2, and bridge rectifiers on the secondary side.

Figure 14:
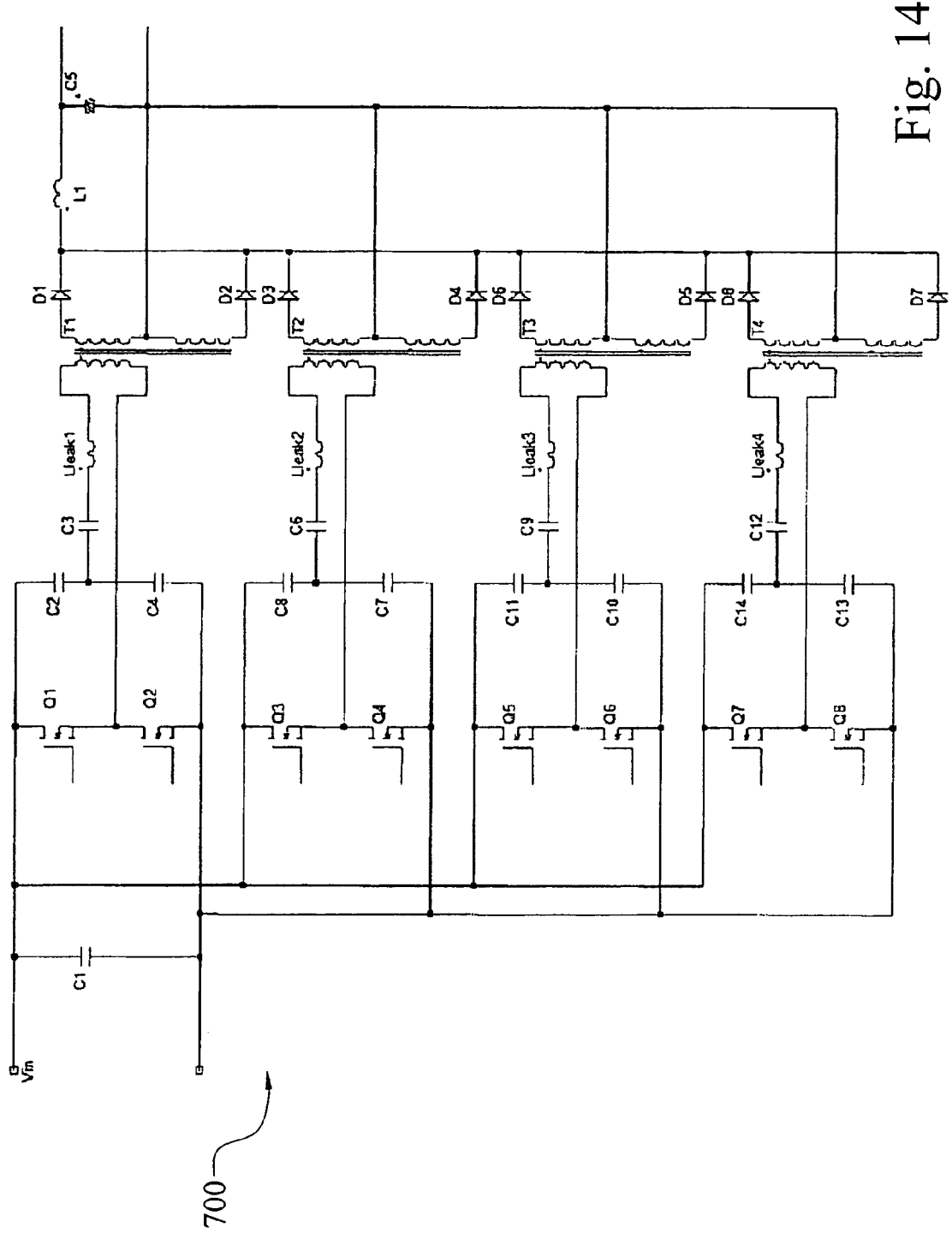
FIG. 14 is a circuit diagram of a multiphase DC to DC converter having four converters each employing a half bridge topology on the primary side and center tapped full bridge rectifiers on the secondary side.
Figure 15:
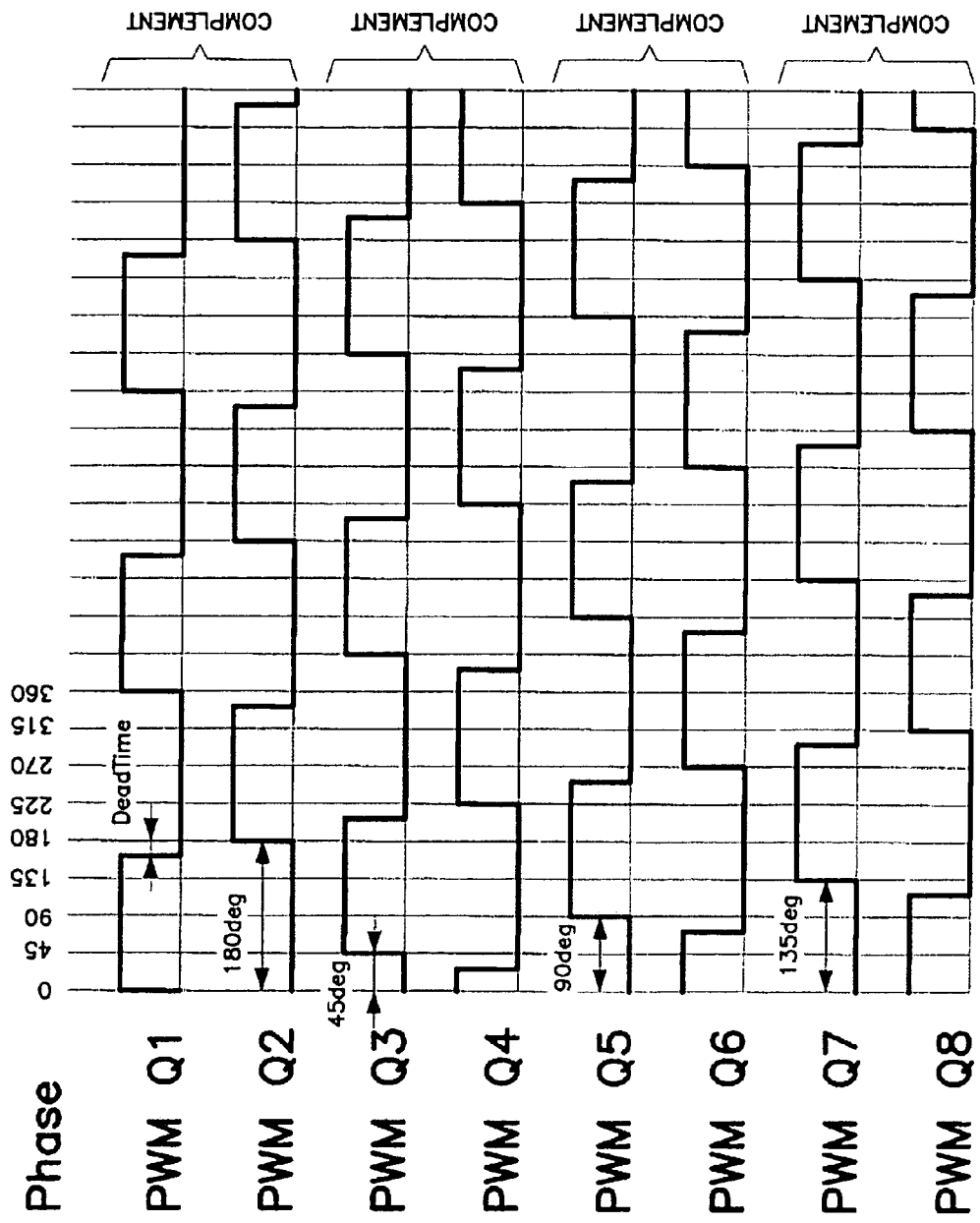
FIG. 15 illustrates drive signal waveforms for the four converters shown in FIG. 14.

FIG. 14 illustrates a multiphase DC to DC converter 700 according to another embodiment of the present disclosure. As shown in FIG. 14, the converter 700 includes four half bridge converters on the primary side of transformers T1-T4, and four center tapped full wave rectifiers on the secondary side. As illustrated in FIG. 15, the half bridge converters are each operated at a duty cycle of approximately fifty percent (50%), and with a phase difference of approximately forty-five degrees (45°).

In addition to the benefits noted above, the teachings of the present disclosure can offer the following additional advantages in any given implementation: higher efficiency; efficiency is nearly independent of the switching frequency; lower voltage stresses allowing lower voltage rated rectifiers; reduced switching losses and body diode conduction losses in synchronous rectifiers (when employed); high power density due to higher switching frequencies without losing efficiency; slow rising currents resulting in lower EMI; lower stresses on semiconductors; low noise due to the absence of reverse recovery currents in the synchronous rectifier body diode (when employed); lower cost due to less silicon usage; and lower cost and higher power density due to small output filter components.

What is claimed is:

1. A multiphase DC to DC converter comprising an input, an output, at least first and second converters, an output inductor, an output capacitor, and a drive circuit, the first and second converters connected in parallel between said input and the output inductor, the first and second converters each including an isolation transformer having a primary winding and at least two power switches coupled to the primary winding, the drive circuit configured for switching the at least two power switches of each of the first and second converters at a duty cycle of approximately fifty percent (50%) with a short dead time therebetween, with the primary winding open circuited during the short dead time, and with a predetermined phase shift between the first and second converters, the output capacitor operatively coupled between the output inductor and the output.

2. The multiphase DC to DC converter of claim 1 wherein the drive circuit is configured to turn on the second converter when the output inductor is being charged by the first converter to thereby achieve substantially zero current transition during turn on of the second converter.

3. The multiphase DC to DC converter of claim 2 wherein the transformer of at least one of the converters includes a secondary winding coupled to at least one synchronous rectifier, and wherein the drive circuit is configured to turn on the synchronous rectifier shortly after turning on one of the power switches of such transformer.

4. The multiphase DC to DC converter of claim 3 wherein the drive circuit is further configured to turn off the synchronous rectifier shortly before turning off one of the power switches of such transformer.

5. The multiphase DC to DC converter of claim 2 wherein the first and second converters include first and second rectification circuits, respectively.

6. The multiphase DC to DC converter of claim 5 wherein the first and second rectification circuits comprise diode rectifiers.

7. The multiphase DC to DC converter of claim 5 wherein the first and second rectification circuits comprise synchronous rectifiers.

8. The multiphase DC to DC converter of claim 2 wherein the drive circuit is configured to provide substantially complementary control signals to said at least two power switches.

9. The multiphase DC to DC converter of claim 1 wherein the predetermined phase shift is about 90 degrees.

10. The multiphase DC to DC converter of claim 1 wherein the first and second converters employ the same topology.

11. The multiphase DC to DC converter of claim 10 wherein the first and second converters are half bridge converters.

12. The multiphase DC to DC converter of claim 10 wherein the first and second converters are full bridge converters.

13. The multiphase DC to DC converter of claim 1 wherein at least the first converter includes a center-tapped full wave rectifier.

14. The multiphase DC to DC converter of claim 1 wherein at least the first converter includes a bridge type rectifier.

15. The multiphase DC to DC converter of claim 1 wherein the first and second converters each include a blocking capacitor and a parasitic inductance in series with the primary winding.

16. The multiphase DC to DC converter of claim 15 wherein the parasitic inductance includes an external inductor.

17. The multiphase DC to DC converter of claim 15 wherein the parasitic inductance includes parasitic inductance reflected from a secondary side of the transformer.

18. The multiphase DC to DC converter of claim 15 wherein the parasitic inductance includes an external inductor and parasitic inductance reflected from a secondary side of the transformer.

19. The multiphase DC to DC converter of claim 15 wherein the blocking capacitor and parasitic inductance of each of the first and second converters are sufficient to cause a reflected load current in the primary winding to resonate back to zero during an on time of the power switches coupled to such primary winding.

20. The multiphase DC to DC converter of claim 19 wherein each transformer has a magnetizing inductance sufficient to achieve substantially zero voltage switching of its associated power switches during the short dead time.

21. A multiphase DC to DC converter comprising an input, an output, at least first and second converters, an output inductor, an output capacitor, and a drive circuit, the first and second converters each including an isolation transformer having a primary winding and at least two power switches coupled to the primary winding, the drive circuit configured for switching the at least two power switches at a fixed frequency with a dead time therebetween, with the primary winding open circuited during the dead time, and with a predetermined phase shift between the first and second converters, the output inductor operatively coupled to the first and second converters, and the output capacitor operatively coupled between the output inductor and the output.

22. A multiphase DC to DC converter comprising an input, an output, at least first and second converters, an output inductor, an output capacitor, and a drive circuit, the drive circuit configured for switching the first and second converters with a predetermined phase shift therebetween, the output inductor operatively coupled to the first and second converters, and the output capacitor operatively coupled between the output inductor and the output, the first and second converters each including an isolation transformer having a primary winding, at least two power switches coupled to the primary winding, and a blocking capacitor and a parasitic inductance in series with the primary winding, the blocking capacitor and parasitic inductance sufficient to cause a reflected load current in the primary winding to resonate back to zero during an on time of the power switches coupled to such primary winding.

23. The multiphase DC to DC converter of claim 22 wherein each transformer has a magnetizing inductance sufficient to achieve substantially zero voltage switching of its associated power switches during an off time of the power switches.

* * * * *